United States Patent
Ko et al.

(10) Patent No.: US 10,224,586 B2
(45) Date of Patent: Mar. 5, 2019

(54) METAL-AIR BATTERY HAVING AIR SUPPLY MODULE AND METHOD OF OPERATING THE METAL-AIR BATTERY

(71) Applicant: Samsung Electronics Co., Ltd., Suwon-si, Gyeonggi-do (KR)

(72) Inventors: Jeongsik Ko, Seongnam-si (KR); Hyukjae Kwon, Suwon-si (KR); Dongmin Im, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 176 days.

(21) Appl. No.: 15/182,907

(22) Filed: Jun. 15, 2016

(65) Prior Publication Data

US 2016/0372808 A1  Dec. 22, 2016

(30) Foreign Application Priority Data

Jun. 17, 2015 (KR) .................. 10-2015-0086178

(51) Int. Cl.
*H01M 12/08* (2006.01)
*H01M 8/04014* (2016.01)
*H01M 8/04082* (2016.01)

(52) U.S. Cl.
CPC ........... *H01M 12/08* (2013.01); *Y02E 60/128* (2013.01)

(58) Field of Classification Search
CPC ................ H01M 12/08; Y02E 60/128
See application file for complete search history.

(56) References Cited

U.S. PATENT DOCUMENTS

| | | |
|---|---|---|
| 5,156,925 A | 10/1992 | Lapp |
| 7,591,880 B2 | 9/2009 | Levan et al. |
| 2007/0015016 A1 | 1/2007 | Aoyama et al. |
| 2014/0045080 A1 | 2/2014 | Albertus et al. |

FOREIGN PATENT DOCUMENTS

JP  5109255 B2  10/2012

OTHER PUBLICATIONS

Hummelshoj et al., "Communications: Elementary oxygen electrode reactions in the aprotic Li-air battery", J. Chem. Phys. 2010, 132 (7), 071101.

*Primary Examiner* — Stewart A Fraser
*Assistant Examiner* — Rachel L Zhang
(74) *Attorney, Agent, or Firm* — Cantor Colburn LLP

(57) ABSTRACT

A metal-air battery includes a battery module configured to generate electricity by oxidation of a metal and reduction of oxygen; an air supply module configured to remove an impurity from air fed to the air supply module, exhaust a purified air which is purified by removing the impurity in the air, and a purge air including the removed impurity to an outside of the air supply module; a first cooling channel connected to the air supply module, wherein the first cooling channel is configured to supply purified air to the battery module an to cool the battery module; and a second cooling channel connected to the air supply module, wherein the second cooling channel is configured to supply the purge air to an external surface of the battery module and to cool the battery module.

19 Claims, 17 Drawing Sheets

METAL-AIR BATTERY HAVING AIR SUPPLY MODULE AND METHOD OF OPERATING THE METAL-AIR BATTERY

CROSS-REFERENCE TO RELATED APPLICATION

This application claims priority to and the benefit of Korean Patent Application No. 10-2015-0086178, filed on Jun. 17, 2015, in the Korean Intellectual Property Office, and all the benefits accruing therefrom under 35 U.S.C. § 119, the content of which in its entirety is incorporated herein by reference.

BACKGROUND

1. Field

The present disclosure relates to a metal-air battery including an air supply module and a method of operating the metal-air battery.

2. Description of the Related Art

Metal-air batteries include a plurality of metal-air cells. Each of the metal-air cells includes a negative electrode that may absorb and discharge ions and a positive electrode in which oxygen in ambient air is used as an active material. A reduction and oxidation reaction of oxygen introduced from outside of the metal-air battery occur in the positive electrode, and an oxidation and reduction reaction of a metal occur in the negative electrode. Chemical energy generated by these processes is converted into electrical energy and is extracted. For example, the metal-air batteries absorb oxygen during discharge and discharge oxygen during charge. In this way, the metal-air batteries use oxygen that is present in the air thus an energy density of a battery can be greater than other secondary batteries. For example, the metal-air batteries may have a high energy density that is several times equal to or greater than an energy density of a lithium ion battery.

In addition, the metal-air batteries operate by absorption and discharging of oxygen without the use of heavy metals and thus have a relatively low potential for environmental contamination. Due to these advantages, much research into metal-air batteries has been conducted.

SUMMARY

Provided is a metal-air battery having an air supply module with a cooling function.

Provided are methods of operating the metal-air battery.

According to an aspect of an exemplary embodiment, a metal-air battery includes: a battery module configured to generate electricity by oxidation of a metal and reduction of oxygen; an air supply module configured to remove an impurity from air fed to the air supply module, exhaust a purified air which is purified by removing the impurity and a purge air including the removed impurity to an outside of the air supply module; a first cooling channel connected to the air supply module, wherein the first cooling channel is configured to supply the purified air to the battery module in order to supply oxygen to the battery module and to cool the battery module; and a second cooling channel connected to the air supply module, wherein the second cooling channel is configured to supply the purge air to an external surface of the battery module and to cool the battery module.

A temperature of the purified air is lower than a temperature of the battery module and a temperature of the purge air is lower than the temperature of the battery module.

The battery module may include a negative electrode metal layer, a negative electrolyte membrane disposed on the negative electrode metal layer, a positive electrode layer which is configured to use oxygen as an active material and is disposed on the negative electrolyte membrane and a gas diffusion layer disposed on at least a portion of the positive electrode layer.

The first cooling channel may is configured to supply the purified air to the gas diffusion layer of the battery module.

The battery module may further include an outer casing which surrounds the negative electrode metal layer, the negative electrolyte membrane, and the positive electrode layer, wherein a portion of the gas diffusion layer is exposed to an outside of the battery module, and wherein the second cooling channel may be configured to supply the purge air to an external surface of the outer casing.

The first cooling channel may be configured to supply the purified air to a first surface of the battery module, and the second cooling channel may be configured to supply the purge air to a second surface that is opposite to the first surface of the battery module.

The gas diffusion layer is at least partially disposed on the positive electrode layer, and the negative electrode metal layer, the negative electrolyte membrane, and the positive electrode layer include a bend, the positive electrode layer may contact an upper surface and a lower surface of the gas diffusion layer and a first side surface of the gas diffusion layer is exposed to the outside of the battery module.

The gas diffusion layer may include a plurality of gas diffusion layers, and the negative electrode metal layer, the negative electrolyte membrane, and the positive electrode layer include a plurality of bends, and the positive electrode layer may contact a lower surface and an upper surface of the plurality of gas diffusion layers.

The first cooling channel may be configured to supply the purified air to the first side surface of the at least one gas diffusion layer, and the second cooling channel may be configured to supply the purge air to the second side surface of the gas diffusion layer, which is opposite to the first side surface of the gas diffusion layer.

The air supply module may be configured to remove the impurity from the air fed to the air supply module by an adsorption method or a membrane separation method.

The purge air may include the impurity.

The air supply module may be configured for at least one method among selected from swing adsorption (PSA), temperature swing adsorption (TSA), pressure temperature swing adsorption (PTSA), vacuum swing adsorption (VSA), and selective separation.

At least one of the first cooling channel and the second cooling channel may include a material with a thermal conductivity of greater than or equal to about 4 watts per meter Kelvin (W/mK).

The first cooling channel and the second cooling channel are configured so the purified air supplied to the battery module by the first cooling channel and the purge air supplied to the battery module by the second cooling channel may flow in a same direction and a parallel direction with respect to the battery module.

The first cooling channel and the second cooling channel are configured so the purified air supplied to the battery module by the first cooling channel flows in a direction which intersects a flow direction of the purge air supplied to the battery module by the second cooling channel.

The metal of the battery module may include lithium.

The impurity may include at least one selected from nitrogen, water, and carbon dioxide.

According to an aspect of another exemplary embodiment, a method of operating the metal-air battery includes: removing an impurity from air fed to the air supply module to prepare a purified air; exhausting the purified air, wherein at least a portion of the impurity in the air is removed; purging air including the removed impurity to the outside of the air supply module to provide a purge air; supplying the purified air to the battery module through the first cooling channel; supplying the purge air including the removed impurity to an external surface of the battery module through the second cooling channel; and discharging the battery module, wherein the battery module is partially or simultaneously cooled by the purified air and the purge air supplied through the first and second cooling channels during the discharging.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
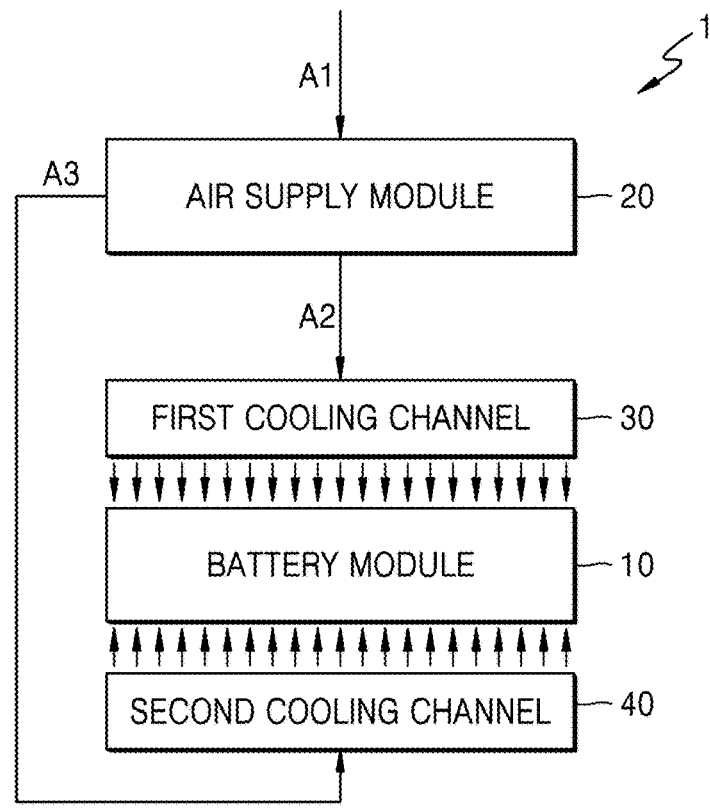
FIG. 1 is a block diagram of a metal-air battery according to an exemplary embodiment.

Reference will now be made in detail to exemplary embodiments, examples of which are illustrated in the accompanying drawings, wherein like reference numerals refer to like elements throughout. The size or thickness of each element may be exaggerated for convenience of explanation. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a conceptual block diagram of a metal-air battery 1 according to an exemplary embodiment.

Referring to FIG. 1, the metal-air battery 1 according to an exemplary embodiment includes a battery module 10, an air supply module 20, a first cooling channel 30, and a second cooling channel 40. The metal-air battery 1 may be a lithium-air battery. However, the metal-air battery 1 is not limited thereto and may be at least one selected from a sodium-air battery, a zinc-air battery, a potassium-air battery, a calcium-air battery, a magnesium-air battery, an iron-air battery, an aluminum-air battery, and an alloy-air battery formed of two or more kinds of metals described above.

The battery module 10 generates electricity by the oxidation of metal and the reduction of oxygen.

For example, when the metal is lithium (Li), the metal-air battery 1 generates electricity through a process in which Li and oxygen react with each other and to produce lithium peroxide ($Li_2O_2$) when the metal-air battery 1 is discharged, as illustrated in the following Reaction Formula 1.

$$Li + \tfrac{1}{2}O_2 \rightarrow \tfrac{1}{2}Li_2O_2 \quad \text{Reaction Formula 1}$$

The air supply module 20 exhausts or generates purified air A2 supplied to the battery module 10. The air supply module 20 removes an impurity from feed air A1 fed to the air supply module from the outside. The impurity may include at least one material selected from nitrogen, water ($H_2O$), and carbon dioxide.

The air supply module 20 exhausts the purified air A2 which is purified by removing the impurity from the feed air A1 to the outside of the air supply module, and the exhausted purified air A2 is supplied to the battery module 10. An oxygen concentration in the purified air A2 exhausted from the air supply module 20 may be higher than an oxygen concentration in the feed air A1 fed to the air supply module 20.

The impurity removed from the feed air A1 may be exhausted (e.g. purged) from the air supply module to provide a purge air A3. For example, the air supply module 20 may exhaust purge air A3 including the impurity removed from the feed air A1 to the outside of the air supply module 20.

The air supply module 20 may be configured to remove an impurity from the feed air A1 fed to the air supply module 20 by an adsorption method or a membrane separation method. For example, the air supply module 20 may be configured to remove an impurity from the feed air A1 fed to the air supply module 20 by at least one method selected from pressure swing adsorption (PSA), temperature swing adsorption (TSA), pressure temperature swing adsorption (PTSA), vacuum swing adsorption (VSA), and selective separation.

In the present specification, PSA refers to a technique in which a particular material is adsorbed or captured by an adsorption material at a high partial pressure and when the partial pressure is reduced, the particular material is desorbed or released. TSA refers to a technique in which the particular material is adsorbed or captured by the adsorption material at a room temperature and when the temperature rises, the particular gas is desorbed or released. PTSA refers to a technique in which the methods of PSA and TSA are combined, and VSA refers to a technique in which a particular material is adsorbed or captured by the adsorption material under atmospheric pressure and the particular material is desorbed or released by the application of a vacuum.

Figure 2A:
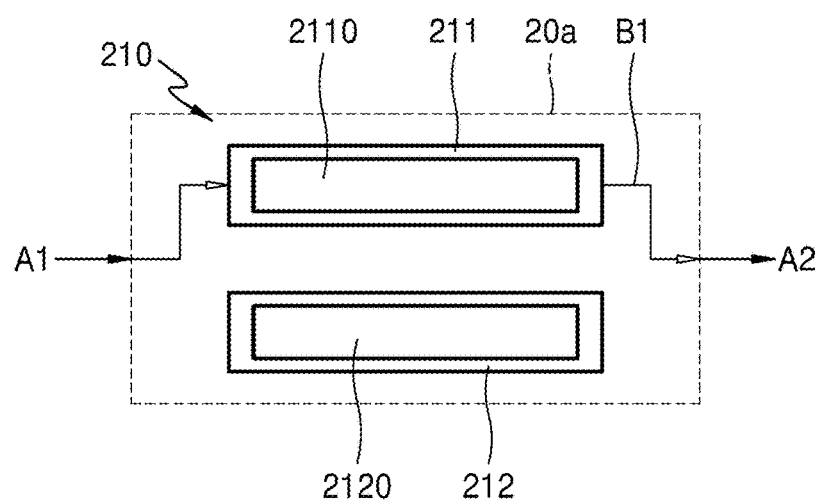
FIGS. 2A to 2C are diagrams illustrating the use of an air supply module which is configured to remove an impurity by an adsorption method according to an exemplary embodiment.
Figure 2B:
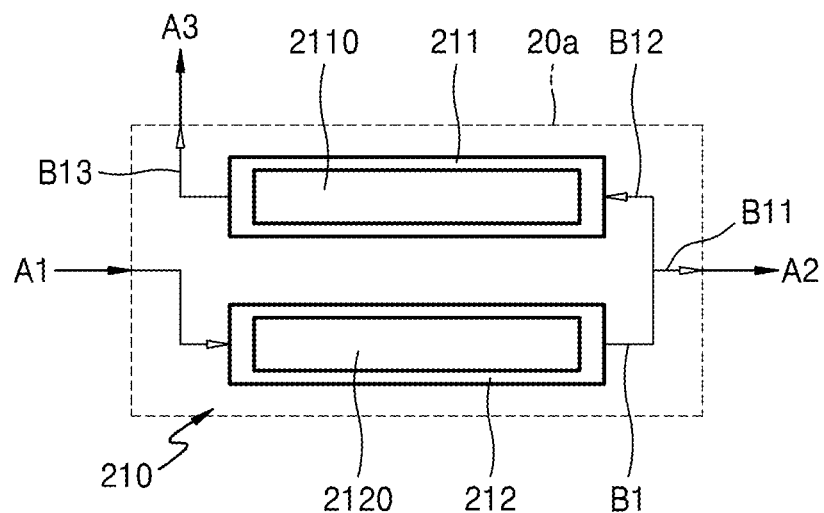
Figure 2C:
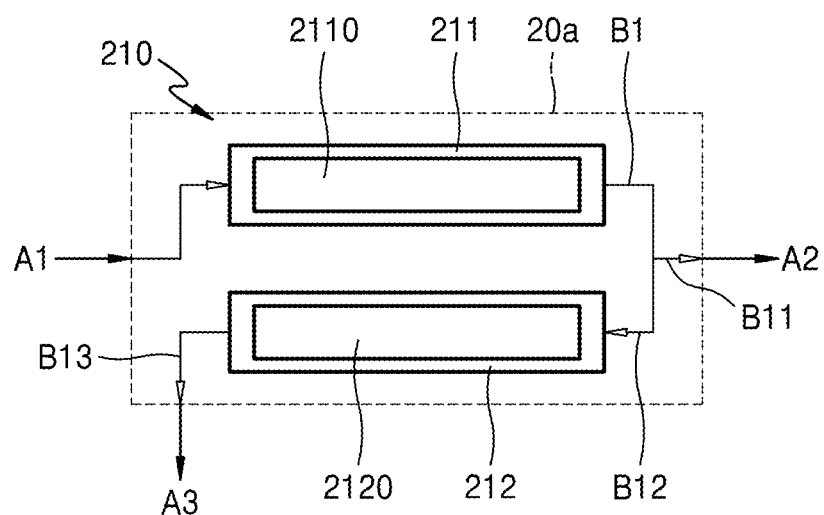

FIGS. 2A to 2C are conceptual diagrams of an air supply module 20a configured to remove an impurity from air using an adsorption method according to an exemplary embodiment. The air supply module 20a configured for the adsorption method will be described with reference to FIGS. 2A to 2C.

The air supply module 20a according to an exemplary embodiment may include an adsorption unit 210 for adsorbing an impurity. When feed air A1 passes through or around, the adsorption unit 210, at least a portion of the impurity included in the feed air A1 is adsorbed by the adsorption unit 210. As a result, the impurity included in the feed air A1 may be removed from the feed air A1.

For example, the adsorption unit 210 includes a plurality of adsorption chambers arranged in parallel. For example, the adsorption unit 210 includes first and second adsorption chambers 211 and 212 arranged in parallel. The first and second adsorption chambers 211 and 212 include adsorption materials 2110 and 2120 for adsorbing an impurity under a prescribed condition.

The first and second adsorption chambers 211 and 212 may be capable of adjusting at least one of an internal temperature and an internal pressure thereof. For example, each of the first and second adsorption chambers 211 and 212 may be capable of individually adjusting its own internal temperature or pressure. Therefore, the internal temperature or pressure of the first and second adsorption chambers 211 and 212 may be the same or may be different from each other.

The adsorption materials 2110 and 2120 selectively adsorb an impurity present in the air under a prescribed condition, for example, under a prescribed pressure condition or a prescribed temperature condition. For example, the adsorption materials 2110 and 2120 may be at least one selected from zeolite, alumina, silica gel, metal-organic framework (MOF), zeolitic imidazolate framework (ZIF), and activated carbon. As used herein, MOF refers to a crystalline compound that includes metallic ions or a metal cluster linked to organic molecules and forms a primary, secondary, or tertiary structure having porosity. In addition, ZIF refers to a nanoporous compound including a tetrahedral cluster of $MN_4$ (where M is a metal) linked by an imidazolate ligand.

Hereinafter, a process for generating and/or exhausting purified air A2 and purge air A3 by the air supply module 20a will be described.

Referring to FIG. 2A, the feed air A1 is supplied to the inside of the first adsorption chamber 211. An internal pressure of the first adsorption chamber 211 is set to be a prescribed pressure at which the adsorption material 2110 may be set to adsorb the impurity. The impurity included in the feed air A1 is adsorbed by the adsorption material 2110 included in the first adsorption chamber 211. Therefore, air B1 exhausted from the first adsorption chamber 211 is in a purified state due to the removal of the impurity. The air B1 exhausted from the first adsorption chamber 211 is immediately exhausted to the outside of the air supply module 20a as purified air A2.

Next, referring to FIG. 2B, the feed air A1 is supplied to the inside of the second adsorption chamber 212 but not to the inside of the first adsorption chamber 211. An internal pressure of the second adsorption chamber 212 is set at a prescribed pressure at which the adsorption material 2120 may adsorb the impurity. The impurity included in the feed air A1 is adsorbed by the adsorption material 2120 included in the second adsorption chamber 212. Therefore, the air B1 exhausted from the second adsorption chamber 212 is in a purified state due to the removal of the impurity.

Partial air B11 of the air B1 exhausted from the second adsorption chamber 212 is immediately exhausted to the outside of the air supply module 20a. The partial air B11 may be exhausted as the purified air A2. Therefore, the purified air A2 is exhausted to the outside of the air supply module 20a. A flow rate of the purified air A2 may be about 50% to about 90% of the flow rate of the air B1 exhausted from the second adsorption chamber 212. The flow rate of the air B1 exhausted from the second adsorption chamber 212 may be substantially the same as the flow rate of the feed air A1.

Remaining air B12 is a portion of the air B1 exhausted from the second adsorption chamber 212, which is not immediately exhausted to the outside of the air supply module 20a. Instead, remaining air B12 first passes (e.g. flows) through the inside of the first adsorption chamber 211 prior to being exhausted to the outside. A flow rate of the remaining air B12 may be about 10% to about 50% of the flow rate of the air B1 exhausted from the second adsorption chamber 212.

While the remaining air B12 flows through the inside of the first adsorption chamber 211, the internal pressure of the first adsorption chamber 211 may be different from the internal pressure of the second adsorption chamber 212. For example, the internal pressure of the first adsorption chamber 211 may be less than the internal pressure of the second adsorption chamber 212. Therefore, the adsorption material 2110 of the first adsorption chamber 211 may release an absorbed impurity unlike the adsorption material 2120 of the second adsorption chamber 212. In this state, as the remaining air B12 of the air B1 exhausted from the second adsorption chamber 212 flows through the inside of the first adsorption chamber 211 and is exhausted to the outside, the impurity released from the adsorption material 2110 of the first adsorption chamber 211 is exhausted to the outside. The remaining air B13, which includes the impurity and flows through the first adsorption chamber 211, may be exhausted as the purge air A3. Therefore, the purge air A3 is exhausted to the outside of the air supply module 20a. A flow rate of the purge air A3 may be about 10% to about 50% of the flow rate of the air B1 exhausted from the second adsorption chamber 212.

As the impurity is exhausted to the outside of the first adsorption chamber 211, the adsorption material 2110 of the first adsorption chamber 211 may be recovered back to a state capable of adsorbing an impurity smoothly.

Next, referring to FIG. 2C, the feed air A1 is supplied to the inside of the recovered first adsorption chamber 211 but not to the inside of the second adsorption chamber 212. The internal pressure of the first adsorption chamber 211 increases so that the adsorption material 2110 may adsorb the impurity, and the internal pressure of the second adsorption chamber 212 may decrease so that the adsorption material 2120 may release the adsorbed impurity. The impurity included in the feed air A1 is adsorbed to the adsorption material 2110 included in the first adsorption chamber 211. Therefore, the air B1 exhausted from the first adsorption chamber 211 is in a purified state due to removal of the impurity.

The partial air B11 of the air B1 exhausted from the first adsorption chamber 211 is immediately exhausted to the outside of the air supply module 20a. The purified air A2 is exhausted to the outside of the air supply module 20a. A flow rate of the purified air A2 may be about 50% to about 90% of the flow rate of the air B1 exhausted from the first adsorption chamber 211.

The remaining air B12 of the air B1 exhausted from the first adsorption chamber 211 is not immediately exhausted to the outside of the air supply module 20a but instead, flows through the inside of the second adsorption chamber 212 before being exhausted to the outside. In the process, the impurity released from the adsorption material 2120 of the second adsorption chamber 212 is exhausted to the outside. The purge air A3 is exhausted to the outside of the air supply module 20a. A flow rate of the purge air A3 may be about 10% to about 50% of the flow rate of the air B1 exhausted from the first adsorption chamber 211.

The exhausting process of the purified air A2 and the purge air A3 by the first and second adsorption chambers 211 and 212 may be repeatedly performed.

Therefore, the air supply module 20a using an adsorption method may exhaust the purge air A3 and simultaneously supply the purified air A2 to the battery module 10. The battery module 10 may be continuously or non-continuously discharged.

As described above, a PSA process is provided as an example of an adsorption method used by the air supply module 20a. However, an adsorption method for the removal of an impurity is not limited to PSA, and other adsorption methods such as TSA, PTSA, or VSA may be used by changing at least one of a material, a temperature, and a pressure condition of the adsorption unit 210.

Figure 3:
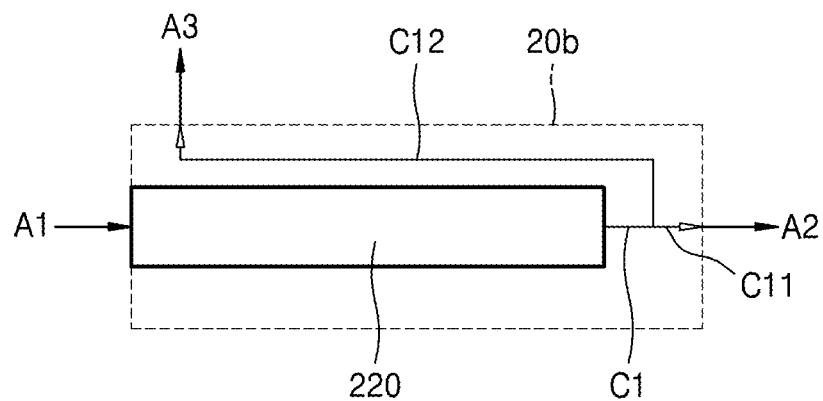
FIG. 3 is a diagram illustrating the use of an air supply module which is configured to remove an impurity by a membrane separation method according to an exemplary embodiment.

FIG. 3 is a conceptual diagram of an air supply module 20b which is based upon a membrane separation method according to an exemplary embodiment. The air supply module 20b using a membrane separation method is described with reference to FIG. 3.

The air supply module 20b includes a permselective membrane 220 for separating an impurity from feed air A1. The permselective membrane 220 is a semipermeable membrane which allows non-impurities to pass through the membrane while selectively retaining an impurity present in the feed air A1. The permselective membrane 220 may include a plurality of ion exchange hollow fibers (not shown) disposed in parallel to each other.

When the feed air A1 flows through or around the permselective membrane 220, the impurity included in the feed air A1 may be separated and retained by the permselective membrane 220.

Partial air C11 of air C1 from which an impurity has been removed is directly exhausted to the outside of the air supply module 20b. The partial air C11 may be exhausted as purified air A2. The purified air A2 is exhausted to the outside of the air supply module 20b. A flow rate of the purified air A2 may be about 50% to about 90% of the flow rate of the air C1 from which an impurity is separated.

Remaining air C12 of the air C1 from which an impurity is separated, is exhausted to the outside of the air supply module 20b after flowing around the permselective membrane 220. The separated impurity is exhausted to the outside by the remaining air C12 as it flows around the permselective membrane 220. The remaining air C12 exhausted to the outside is exhausted to purge air A3. That is, the purge air A3 is exhausted to the outside of the air supply module 20b. A flow rate of the purge air A3 may be about 10% to about 50% of the flow rate of the air C1 from which an impurity is separated.

Therefore, the air supply module 20b using a membrane separation method may exhaust the purge air A3 and simultaneously supply the purified air A2 to the battery module 10. The battery module 10 may perform continuous discharge.

Referring again to FIG. 1, the battery module 10 of the metal-air battery 1 according to an exemplary embodiment may generate a predetermined amount of heat while generating electricity. Furthermore, a predetermined amount of heat also may be generated while electric current flows from the battery module 10. Therefore, the battery module 10 may be inadvertently heated while the battery module 10 is discharging.

In this regard, the metal-air battery 1 according to another exemplary embodiment further includes first and second cooling channels 30 and 40 in addition to the battery module 10 and the air supply module 20.

The first cooling channel 30 supplies the purified air A2 exhausted from the air supply module 20 to the battery module 10. Oxygen is supplied to the battery module 10 by the purified air A2 supplied through the first cooling channel 30. A flow rate of the purified air A2 may be about 50% to about 90% of the flow rate of the feed air A1.

A temperature of the purified air A2 may be lower than the temperature of the battery cell module 10. Therefore, the battery module 10 may be cooled by the purified air A2 supplied through the first cooling channel 30.

The second cooling channel 40 supplies the purge air A3 exhausted from the air supply module 20 to an external surface of the battery module 10. A flow rate of the purge air A3 may be about 10% to about 50% of the flow rate of the feed air A1. The flow rate of the purge air A3 may be about 0.1 times to about 1 times the flow rate of the purified air A2. A temperature of the purge air A3 may be lower than the temperature of the battery module 10. The battery module 10 may be cooled by the purge air A3 supplied through the second cooling channel 40.

If the purge air A3 is exhausted to the outside of the metal-air battery 1 without being supplied to the battery module 10, the energy used to exhaust the purge air A3 may result in an energy loss of the metal-air battery 1. However, the metal-air battery 1 according to an exemplary embodiment may not only reduce the energy loss due to the exhaustion of the purge air A3 but may also cool the battery module 10 without any additional configuration, by using the purge air A3 to cool the battery module 10 by using the second cooling channel 40.

However, as described above, the purge air A3 includes an impurity generated when the purified air A2 is generated in the air supply module 20. The second cooling channel 40 may be configured to supply the purge air A3 to the external surface of the battery module 10 so that the impurity included in the purge air A3 may not affect an oxidation reduction reaction occurring in the battery module 10.

Figure 4:
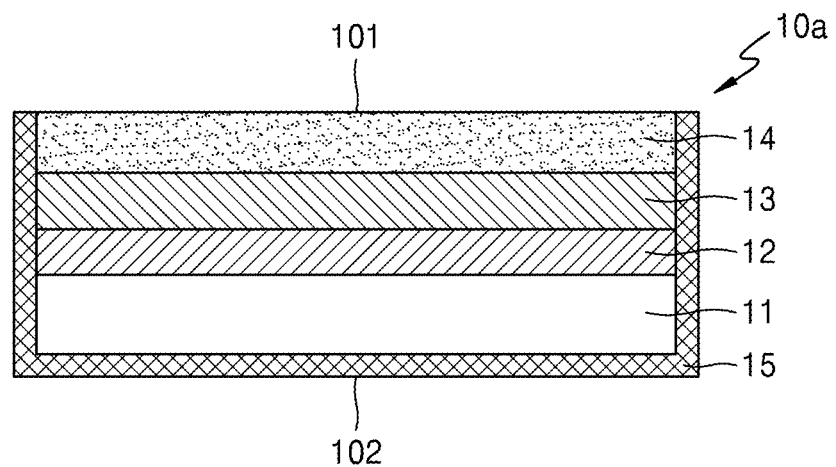
FIG. 4 is a cross-sectional view of a battery module according to an exemplary embodiment.
Figure 5A:
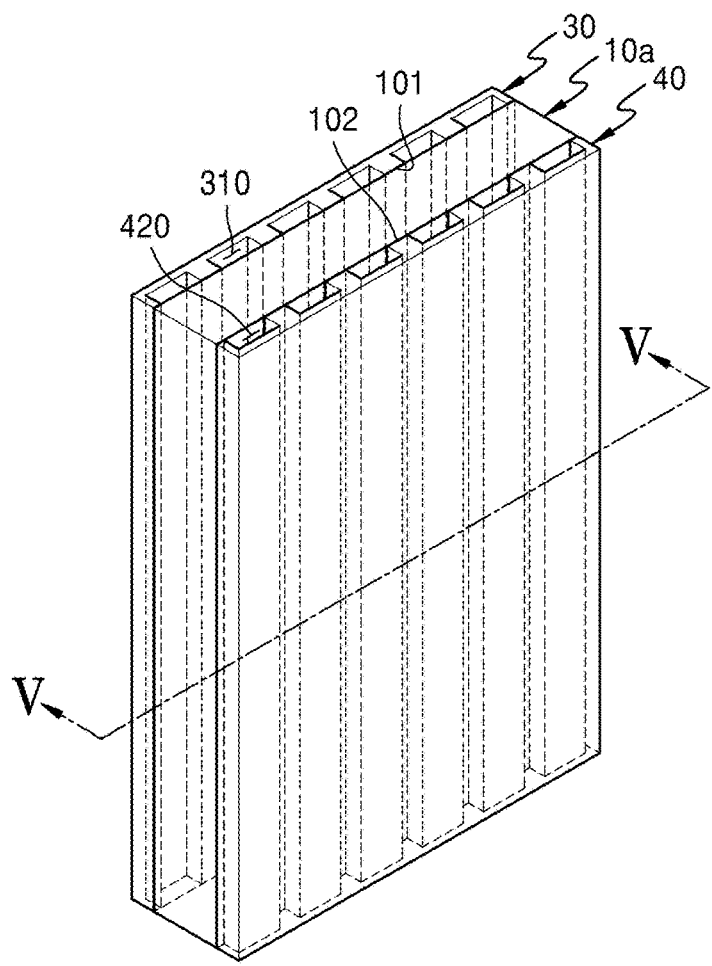
FIG. 5A is a perspective view of an arrangement of first and second cooling channels in a battery module.
Figure 5B:
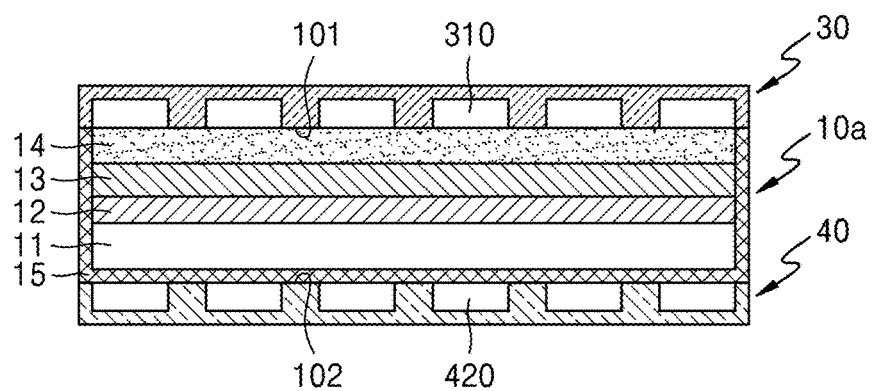
FIG. 5B is a cross-sectional view of the battery module in FIG. 5A, according to an exemplary embodiment.

FIG. 4 is a cross-sectional view of a battery module 10a according to another exemplary embodiment FIG. 5A is a perspective view of an arrangement of first and second cooling channels 30 and 40 in the battery cell module 10a, and FIG. 5B is a cross-sectional view of the battery module 10 a in FIG. 5A, according to an exemplary embodiment.

Referring to FIG. 4, the battery module 10a includes a negative electrode metal layer 11, a negative electrolyte layer 12, a positive electrode layer 13, and a gas diffusion layer 14.

The negative electrode metal layer 11 is configured to absorb and exhaust metallic ions. The negative electrode metal layer 11 may include, for example, at least one selected from lithium (Li), sodium (Na), zinc (Zn), potassium (K), calcium (Ca), magnesium (Mg), iron (Fe), aluminum (Al), and an alloy of two or more thereof.

The negative electrolyte layer 12 is disposed on the negative electrode metal layer 11 and transmits the metal ions to the positive electrode layer 13. Therefore, the negative electrolyte layer 12 may include an electrolyte.

In one example, the electrolyte may be a solid phase including at least one selected from a high molecular electrolyte, an inorganic electrolyte, and a composite electrolyte and may be manufactured to be bendable.

In another example, the electrolyte may be formed by dissolving metallic salts in a solvent.

The metallic salts may be at least one lithium salt selected from $LiN(SO_2CF_2CF_3)_2$, $LiN(SO_2C_2F_5)_2$, $LiClO_4$, $LiBF_4$, $LiPF_6$, $LiSbF_6$, $LiAsF_6$, $LiCF_3SO_3$, $LiN(SO_2CF_3)_2$, $LiC(SO_2CF_3)_3$, $LiN(SO_3CF_3)_2$, $LiC_4F_9SO_3$, $LiAlCl_4$, and lithium bis(trifluoromethanesulfonyl)imide (LiTFSI). Other metallic salts, such as, at least one selected from $AlCl_3$, $MgCl_2$, NaCl, KCl, NaBr, KBr, and $CaCl_2$ may be added to the above-described lithium salts.

The solvent that may be used to dissolve the lithium salts and the metallic salts may be used without limitation. For example, the solvent may include at least one selected from a carbonate-based solvent, such as dimethylcarbonate (DMC), an ether-based solvent, such as methyl acetate, an ether-based solvent, such as dibutyl ether, a ketone-based solvent, such as cyclohexanone, an amine-based solvent, such as triethylamine, and a phosphine-based solvent, such as triethylphosphine.

An oxygen barrier layer (not shown) may be disposed between the negative electrolyte layer 12 and the positive electrode layer 13. The oxygen barrier layer may prevent transmission of oxygen and may have conductivity with respect to the metallic ions. The oxygen barrier layer may include a bendable high molecular weight material. For example, the oxygen barrier layer may be a porous film including an olefin-based resin, such as a nonwoven fabric of high molecular weight polyethylene, such as a nonwoven fabric formed of polypropylene or a nonwoven fabric formed of polyphenylene sulfide and polypropylene, or a porous separation layer including a combination thereof.

The oxygen barrier layer and the negative electrolyte layer 12 may be formed separately. Alternatively, the oxygen barrier layer and the negative electrolyte layer 12 may be the same single layer formed by immersing an electrolyte into pores of a porous separation layer having an oxygen blocking function. For example, an electrolyte including a mixture of polyethylene oxide (PEO) and LiTFSI may be immersed into the pores of the porous separation layer so that the negative electrolyte layer 12 and the oxygen barrier layer may be integrated with each other.

The positive electrode layer 13 may include an electrolyte for conduction of the metallic ions, a catalyst for oxidation and reduction of oxygen, a conductive material, and a binder. For example, after the above-described electrolyte, catalyst, conductive material and binder are mixed with each other; a solvent is added to the mixture so that a positive electrode slurry may be manufactured. The positive electrode slurry may be applied to the oxygen barrier layer and then may be dried to form the positive electrode layer 13. The solvent may be the same as a solvent used to manufacture the electrolyte included in the negative electrolyte layer 12.

The electrolyte included in the positive electrode layer 13 may include a lithium salt which is included in the negative electrolyte layer 12 and may also include a metallic salt selectively.

The catalyst may include an oxide of a metal which is at least one selected from platinum (Pt), gold (Au), silver (Ag), manganese (Mn), nickel (Ni), cobalt (Co), and an alloy of two or more thereof.

The conductive material may include at least one selected from a carbon-based material having porosity, such as carbon black, graphite, graphene, activated carbon, carbon fiber or carbon nanotubes (CNTs), a conductive metallic material having a metal powder shape, such as Cu powder, Ag powder, Ni powder or Al powder, and a conductive organic material, such as a polyphenylene derivative.

The binder may include at least one selected from polytetrafluoroethylene (PTFE), polypropylene, polyvinylidene fluoride (PVDF), polyethylene, and styrene-butadiene rubber.

The gas diffusion layer 14 performs a function of uniformly supplying the purified air A2 to the positive electrode layer 13.

The gas diffusion layer 14 may include a metal having a porous structure, and may be at least one selected from a ceramic, a polymer, and a carbon material. The gas diffusion layer 14 has a porous structure, thereby adsorbing the purified air A2 exhausted from the air purification module 20 and smoothly diffusing the adsorbed air.

As the metal having a porous structure, a foaming metal having a sponge shape or a metal fiber mat may be used.

As the porous ceramics, a magnesium-aluminum silicate may be used.

As the porous polymer, a porous polyethylene or porous polypropylene may be used.

As the porous carbon material, a carbon paper that includes a carbon fiber, a carbon cloth or a carbon felt may be used.

The battery module 10a may further include an outer casing 15. The outer casing 15 may allow a portion of the gas diffusion layer 14 to be exposed the outside and surround other elements excluding the gas diffusion layer 14, for example, the negative electrode metal layer 11, the negative electrolyte layer 12, and the positive electrode layer 13. The battery module 10a may prevent exposure of the other elements excluding the gas diffusion layer 14 by the outer casing 15.

Referring to FIGS. 5A and 5B, a first cooling channel 30 may be disposed on a first surface 101 of the battery module 10a and a second cooling channel 40 may be disposed on a second surface 102 of the battery module 10a. The first surface 101 may be a surface of the portion of the gas diffusion layer 14 which is exposed and the second surface 102 may be a surface of the outer casing 15. The second surface 102 of the battery module 10a may be opposite to the first surface 101 in the battery module 10a.

The first cooling channel 30 may include at least one first cooling flow passages 310 through which the purified air A2 may flow. The number of first cooling flow passages 310 is not limited and may be a single first cooling flow passage 310 or a plurality of first cooling flow passages 310.

The second cooling channel 40 may include at least one second cooling flow passage 420 through which the purge air A3 may flow. The number of second cooling flow passages 420 is not limited and may be a single second cooling flow passage 420 or a plurality of second cooling flow passage 420. The number, shape, and size of the first and second cooling flow passages 310 and 420 are illustrated as being the same, but are not limited thereto, and at least one of the numbers, shapes, and sizes of the first and second cooling flow passages 310 and 420 may be different.

It is possible to efficiently cool the battery module 10a by cooling the first surface 101 of the battery module 10a with the purified air A2 flowing in the first cooling flow passage 310 of the first cooling channel 30 and cooling the second surface 102 of the battery module 10a with the purge air A3 flowing in the second cooling flow passage 420 of the second cooling channel 40.

At least one of the first and second cooling channels 30 and 40 may include a thermally conductive material. At least one of the first and second cooling channels 30 and 40 may function as a heat radiating member. For example, the first and second cooling channels 30 and 40 may include a thermally conductive material having a thermal conductivity of greater than or equal to about 1 watt per meter Kelvin (w/mK). For example, the first and second cooling channels 30 and 40 may include a resin having a thermal conductivity of greater than or equal to about 1 W/mK or more. However, materials of the first and second cooling channels 30 and 40 are not limited to the resin, and may be another material as long as the thermal conductivity of the material is greater than or equal to about 1 W/mK. For example, the first and second cooling channels 30 and 40 may include a metal having a thermal conductivity of greater than or equal to about 1 W/mK.

Figure 6:
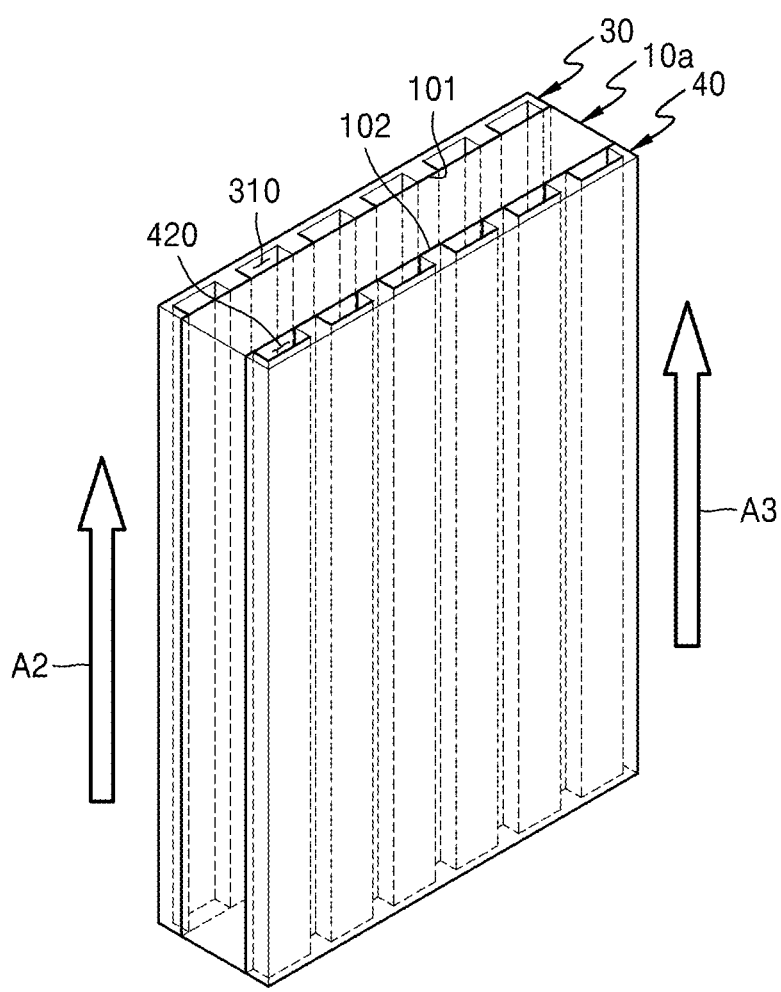
FIG. 6 is a schematic view of a flow of purified air and purge air through first and second cooling channels in a battery module, according to an exemplary embodiment.
Figure 7A:
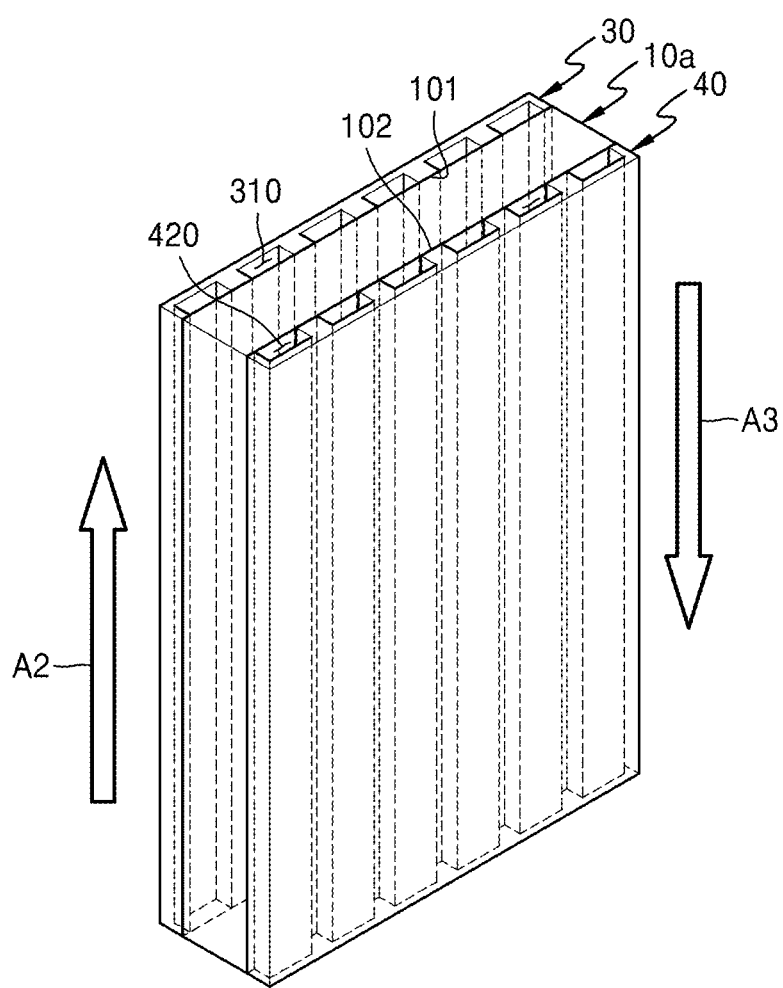
FIGS. 7A and 7B are perspective views of flow of purified air and purge air through first and second cooling channels in a battery module according to another exemplary embodiment.
Figure 7B:
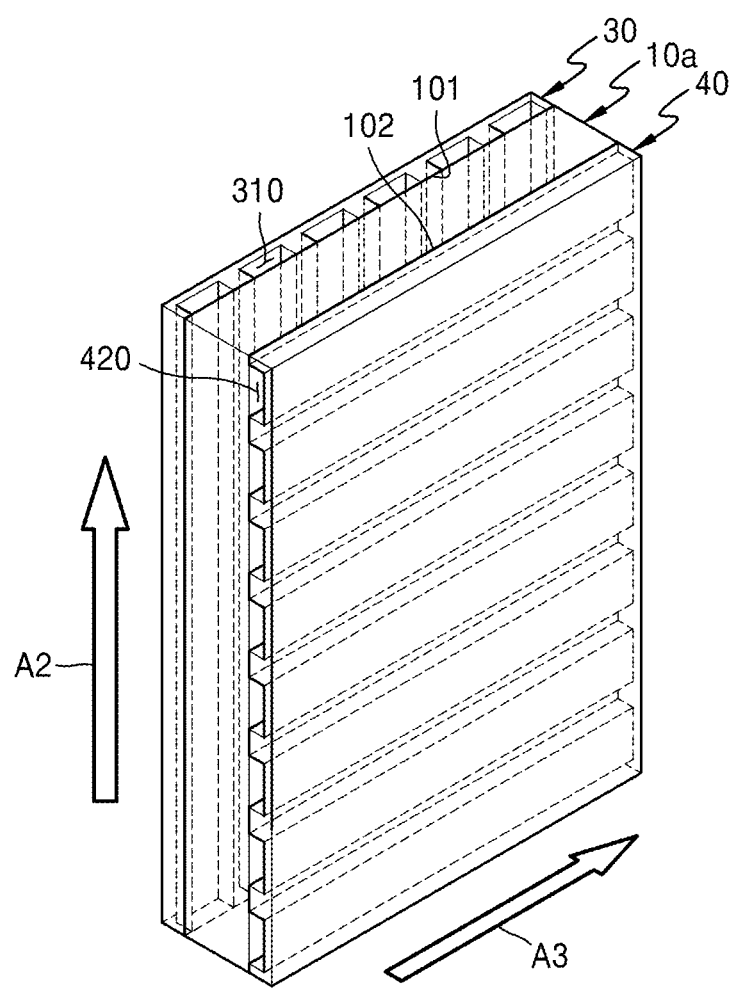

FIG. 6 is a schematic view of a flow of purified air A2 and purge air A3 supplied to a battery module 10a through first and second cooling channels 30 and 40 according to an exemplary embodiment. FIGS. 7A and 7B are schematic views of flow of purified air A2 and purge air A3 supplied to a battery module 10a through first and second cooling channels 30 and 40 according to another exemplary embodiment.

Referring to FIG. 6, the purified air A2 supplied to the battery module 10a by the first cooling channel 30 may flow in a first direction, for example, an upward (e.g. vertical) direction with respect to the battery module 10a. Therefore, a first surface 101 of the battery module 10a may be cooled in the upward direction.

The purge air A3 supplied to the battery module 10a by the second cooling channel 40 may flow in the same direction and parallel to the first direction, for example, an upward direction with respect to the battery module 10a. Therefore, a second surface 102 of the battery module 10a may be cooled in the upward direction. The purge air A3 and the purified air A2 may thus have flow in a co-current direction with respect to each other in the battery module 10a. Therefore, the battery module 10a may be cooled from a lower portion to an upper portion of the battery module 10a.

However, a flow of the purified air A2 and the purge air A3 is not limited thereto and may be suitably changed as desired. For example, as described with reference to FIG. 7A, the purge air A3 supplied to the battery module 10a by the second cooling channel 40 may flow in an opposite direction parallel to the first direction with respect to the battery module 10a. The purge air A3 and the purified air A2 may have a cross flow direction with respect to each other in the battery module 10a. For example, as described with reference to FIG. 7B, the purge air A3 supplied to the battery module 10a by the second cooling channel 40 may flow in a direction which intersects the first direction with respect to the battery module 10a. The purge air A3 and the purified air A2 may flow in a cross flow with respect to each other in the battery module 10a. Therefore, the entire region of the battery module 10a may be uniformly cooled.

Figure 8:
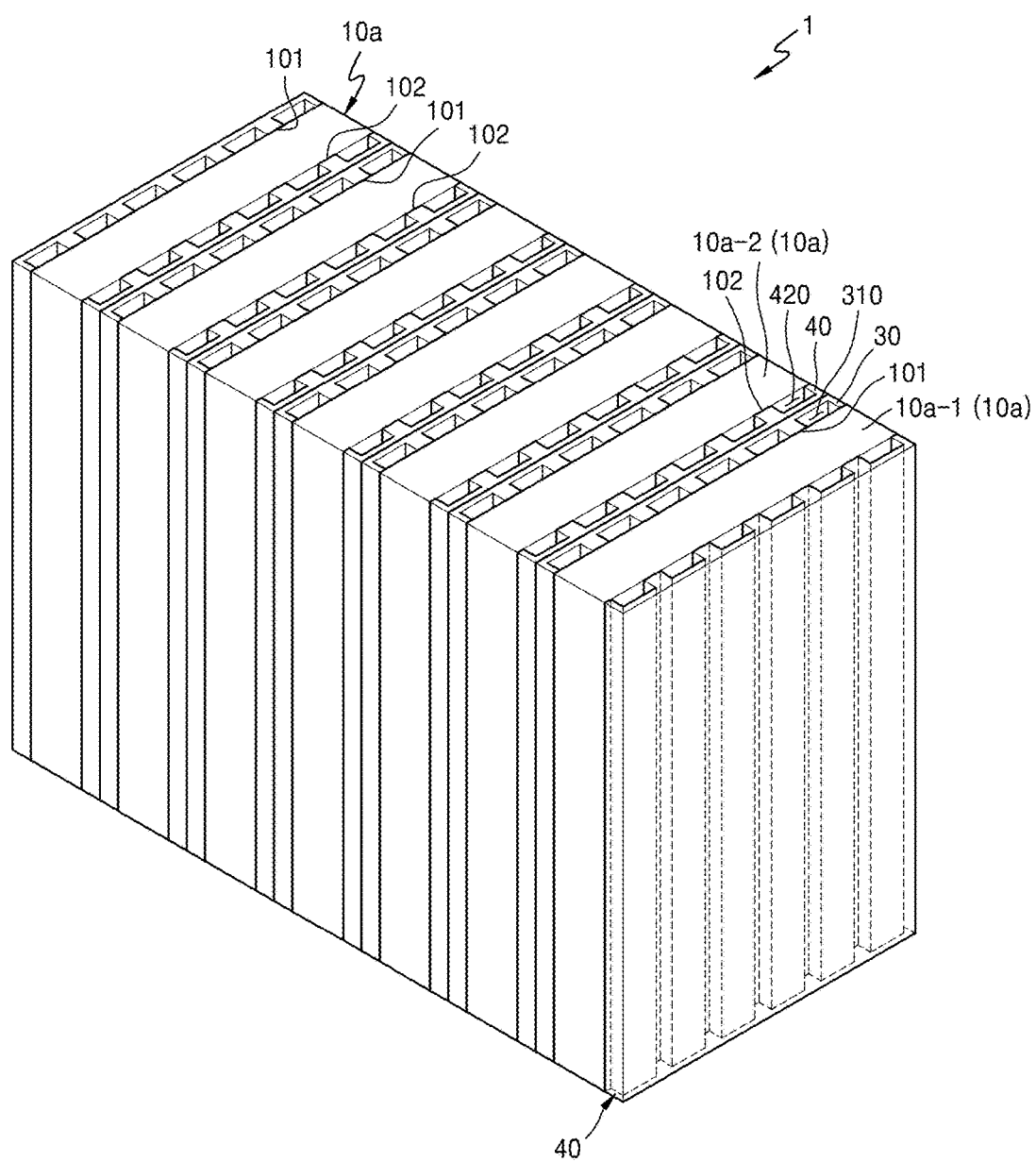
FIG. 8 is a perspective view of a metal-air battery including a plurality of battery modules according to an exemplary embodiment.

FIG. 8 is a perspective view of a metal-air battery 1 including a plurality of battery modules 10a according to an exemplary embodiment. Referring to FIG. 8, a plurality of battery modules 10a may be separated apart from each other at a prescribed interval. First and second cooling channels 30 and 40 may be disposed between each of the adjacent battery modules 10a. For example, first and second cooling channels 30 and 40 may be disposed between a first battery module 10a-1 and a second battery module 10a-2. The first cooling channel 30 supplies purified air A2 on a first surface 101 of the first battery module 10a-1 and the second cooling channel 40 supplies purge air A3 on a second surface 102 of the second battery module 10a-2.

Figure 9A:
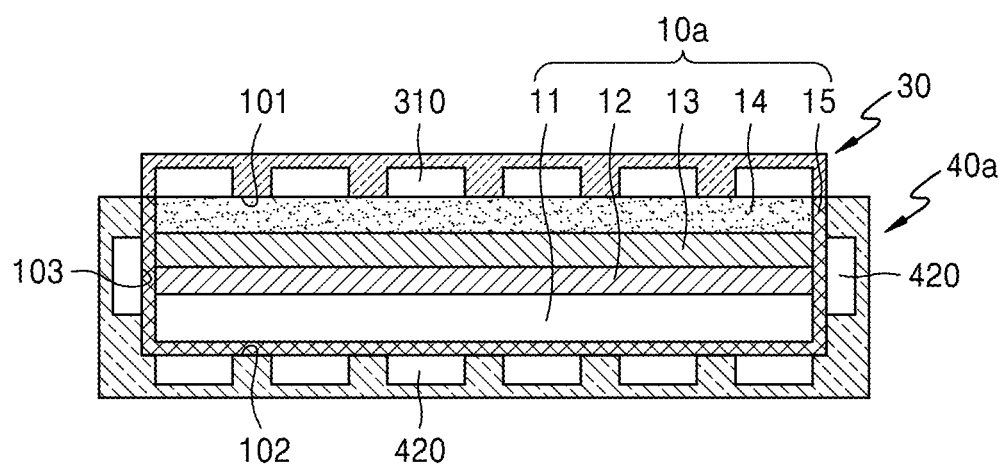
FIGS. 9A and 9B are cross-sectional views of an arrangement of a second cooling channel according to another exemplary embodiment.
Figure 9B:
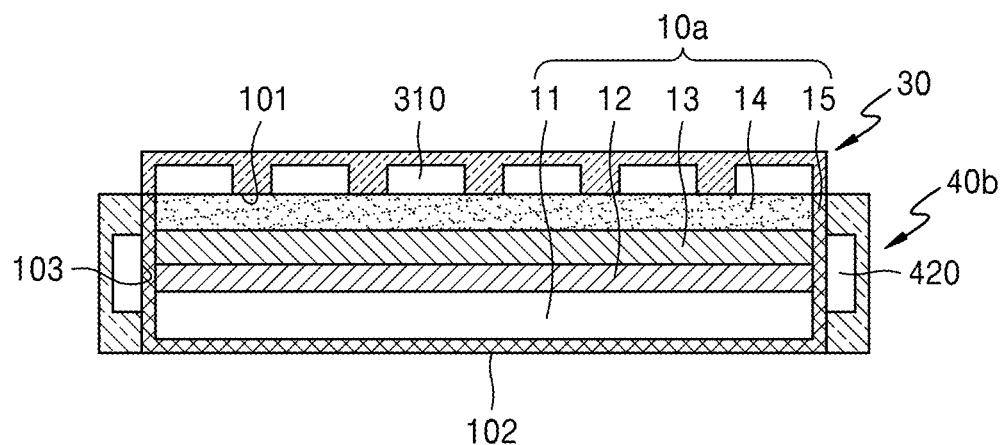

In an embodiment, the first cooling channel 30 is arranged on the first surface 101 of the battery module 10a and the second cooling channel 40 is arranged on the second surface 102 of the battery module 10a in the above exemplary embodiment. However, the arrangement of the first and second cooling channels 30 and 40 is not limited thereto and may be variously changed. For example, as described with reference to FIG. 9A, a second cooling channel 40a may be arranged on the second surface 102 of the battery modules 10a and a side surface 103 connecting the first and second surfaces 101 and 102. For example, as described with reference to FIG. 9B, a second cooling channel 40b may be arranged on the side surface 103 of the battery module 10a.

Figure 10A:
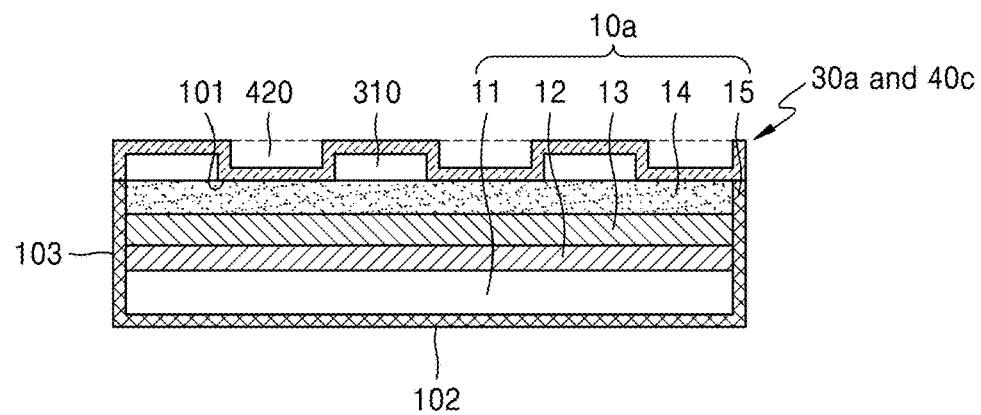
FIGS. 10A to 10C are cross-sectional views of an arrangement of a second cooling channel and second cooling channel flow passages in the battery module according to another exemplary embodiment.
Figure 10B:
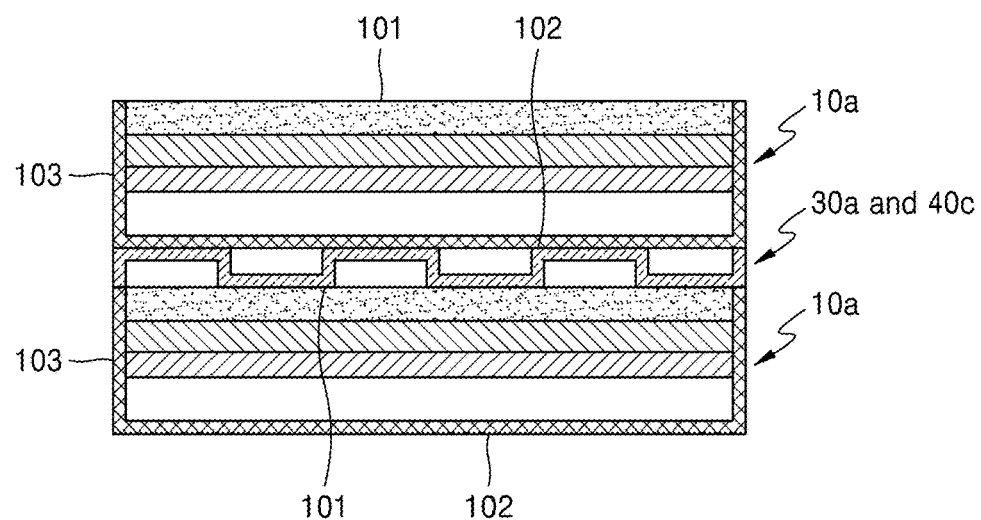

For example, as described with reference to FIG. 10A, a second cooling channel 40c may be disposed on a first surface 101 of battery module 10a adjacent to a first cooling channel 30a. In this case, in order that an impurity included in purge air A3 is not supplied to a gas diffusion layer 14, second cooling flow passages 420 of the second cooling channel 40c are arranged so as not to directly contact the gas diffusion layer 14. As described with reference to FIG. 10B, another battery module 10a may be disposed on second cooling flow passages 420 of a second cooling channel 40c. In this case, the second cooling channel 40c simultaneously cools a first surface 101 of the battery module 10a arranged below a lower portion and a second surface 102 of the battery module 10a arranged above an upper portion.

Figure 10C:
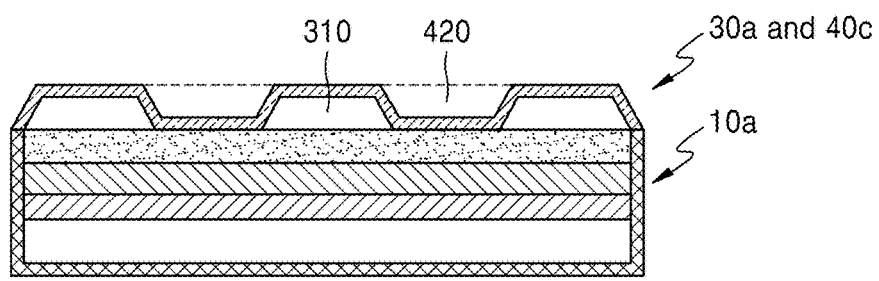

Also, while the above exemplary embodiment is an example of the first and second cooling flow passages 310 and 420 having a square shape, but the shape is not limited thereto and may be variously changed. For example, as described with reference to FIG. 10C, the first and second cooling flow passages 310 and 420 may have a trapezoid shape. In addition, the first and second cooling flow passages 310 and 420 may have a polygonal shape including at least one selected from a triangle shape, a circular shape, an oval shape, and a semicircular shape (not shown).

Figure 11A:
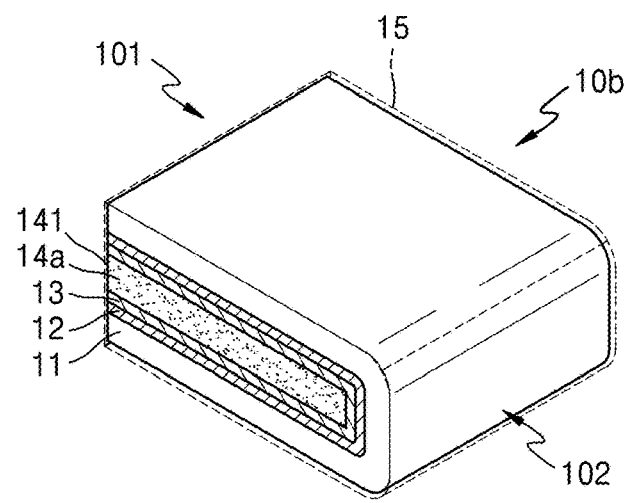
FIGS. 11A and 11B are perspective views of a battery module according to another exemplary embodiment.
Figure 11B:
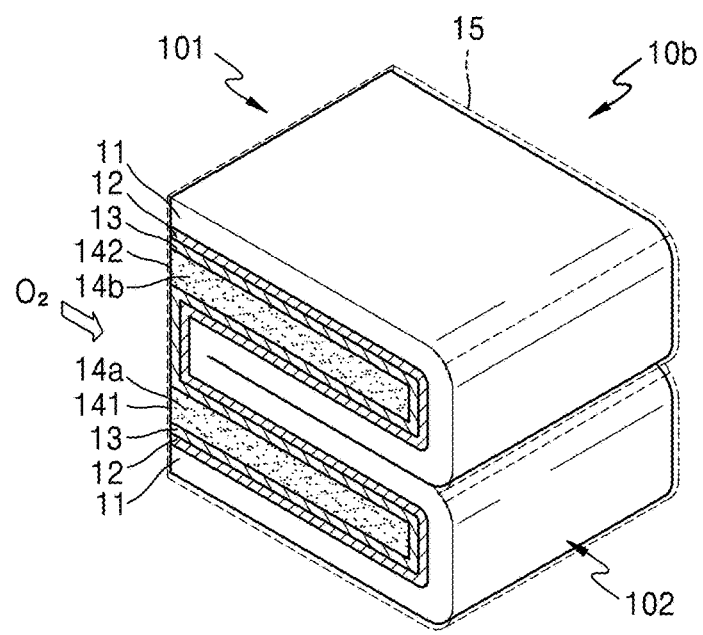
Figure 12:
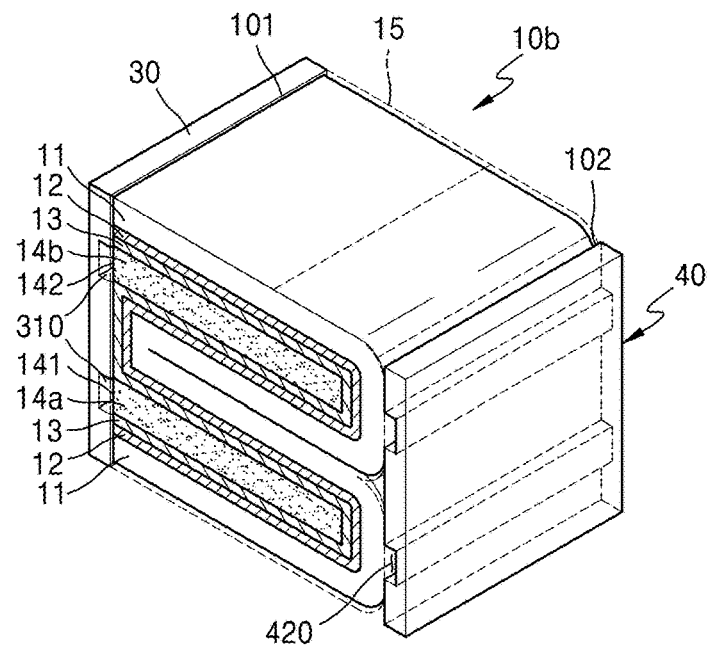
FIGS. 12 and 13 are perspective views of an arrangement of first and second cooling channels in a battery module according to another exemplary embodiment.
Figure 13:
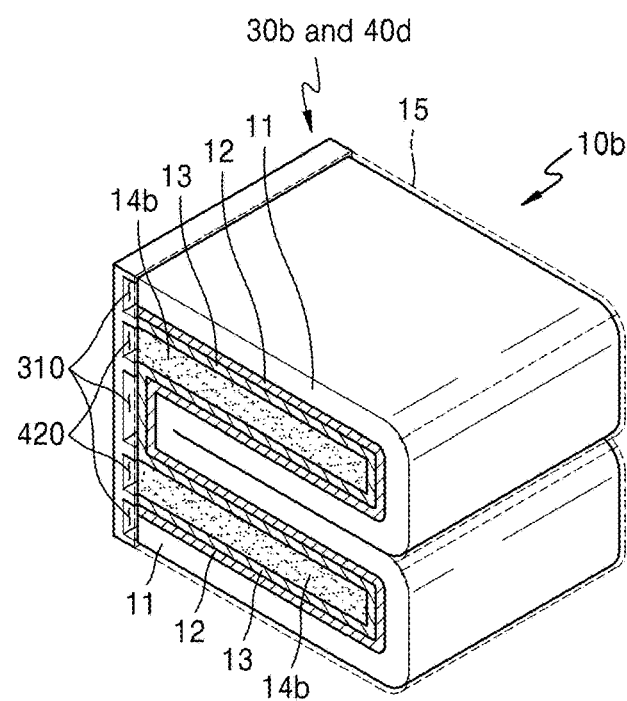

FIGS. 11A and 11B are perspective views of a battery module 10b according to another exemplary embodiment. FIGS. 12 and 13 are perspective views of an arrangement of first and second cooling channels 30 and 40 in a battery module 10b according to another exemplary embodiment.

Referring to FIG. 11A, the battery module 10b includes a negative electrode metal layer 11, a negative electrolyte layer 12, a positive electrode layer 13, and a gas diffusion layer 14a. Repeated descriptions of the above exemplary embodiments are omitted and only the differences between the embodiments are described with reference to FIG. 11A.

The gas diffusion layer 14a may be partially disposed on the positive electrode layer 13. A side surface 141 of the gas diffusion layer 14a may be exposed to the outside. For example, the negative electrode metal layer 11, the negative electrolyte layer 12, and the positive electrode layer 13 each may be bent around the gas diffusion layer 14a so that the positive electrode layer 13 may contact an upper surface of the gas diffusion layer 14a. Therefore, the negative electrode metal layer, the negative electrolyte membrane, and the positive electrode layer each include a bend.

Regions or surfaces of the battery module 10b, excluding the side surface 141 of the gas diffusion layer 14a, may be surrounded by an outer casing 15 and thus are not exposed to the outside. Regions or surfaces of the battery module 10b excluding the side surface 141 of the gas diffusion layer 14a thus may be sealed by the outer casing 15.

Referring to FIG. 11B, the battery module 10b may include a plurality of gas diffusion layers 14a and 14b. For example, the battery module 10b may include two gas diffusion layers 14a and 14b. The negative electrode metal layer 11, the negative electrolyte layer 12, and the positive electrode layer 13 may be repeatedly bent so that the positive electrode layer 13 may respectively contact a lower surface and an upper surface of the gas diffusion layers 14a and 14b. Thus, the negative electrode metal layer, the negative electrolyte membrane, and the positive electrode layer each include a plurality of bends.

Another region or surface of the battery module 10b excluding side surfaces 141 and 142 of the gas diffusion layers 14a and 14b, respectively, may be not exposed by the outer casing 15.

Referring to FIG. 12, the first cooling channel 30 may be disposed on a side surface 101 of a battery module 10b and a second cooling channel 40 may be disposed on another side surface 102 of the battery module 10b. Side surfaces 141 and 142 of gas diffusion layers 14a and 14b may be exposed to the outside on the side surface 101 of the battery module 10b. Therefore, the first cooling channel 30 may supply the purified air A2 to the side surfaces 141 and 142 of the gas diffusion layers 14a and 14b. The second cooling channel 40 may supply the purge air A3 to a surface of an outer casing 15 that is opposite to the surfaces 141 and 142 of the gas diffusion layers 14a and 14b in the battery module 10b.

In addition, the arrangement of the second cooling channel 40 may be variously changed as long as the purge air A3 passing through second cooling flow passages 420 is not supplied to the gas diffusion layer 14. For example, referring to FIG. 13, both the first and second cooling channels 30 and 40 may be arranged on a side surface 101 of the battery module 10b. First cooling flow passages 310 of the first cooling channel 30 may be disposed in a position corresponding to exposed side surfaces 141 and 142 of gas diffusion layers 14a and 14b and second cooling flow passages 420 of the second cooling channel 40 may supply purge air A3 to a surface of an outer casing 15 that is adjacent to the exposed side surfaces 141 and 142 of the gas diffusion layers 14a and 14b.

FIGS. 14A to 14E is illustrates results of a simulation and show a change in a temperature distribution according to a change of speed of purified air A2 for a comparative battery module in which a first cooling channel is disposed on a first surface 101 of the battery module. FIGS. 15A to 15E show the results of a simulation and illustrate a change in a temperature distribution according to a change of speed of purified air A2 and purge air A3 in an Example battery module 10a in which a first cooling channel 30 is disposed on a first surface 101 of the battery cell module, and a second cooling channel 40 is disposed on a second surface 102 of the battery cell module 10a. For reference, battery modules 10a of FIGS. 14 and 15 are sections of the battery module 10a of FIG. 4 taken along a vertical direction, in which an upper surface of the section is a region corresponding to the first surface 101 of FIG. 4 and a lower surface of the section is a region corresponding to the second surface 102 of FIG. 4.

Figure 14A:
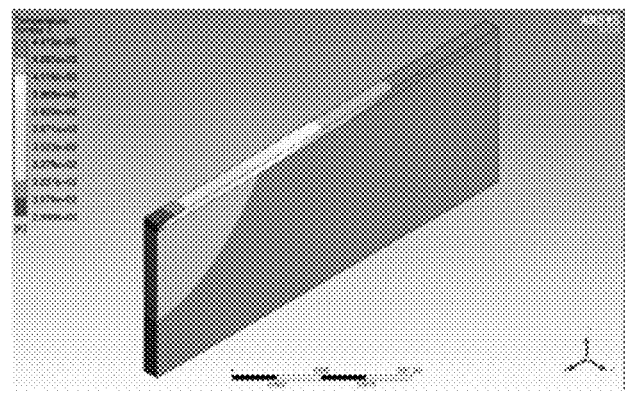
FIGS. 14A to 14E are the results of a simulation illustrating a change in a temperature distribution according to a change of speed of purified air in a comparative battery module in which a first cooling channel is disposed on a first surface of the battery cell module.
Figure 14B:
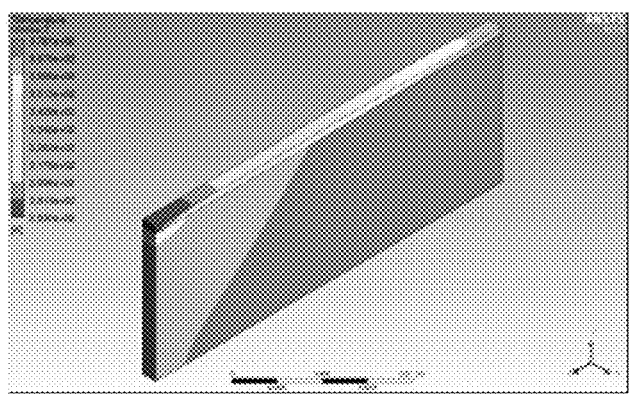
Figure 14C:
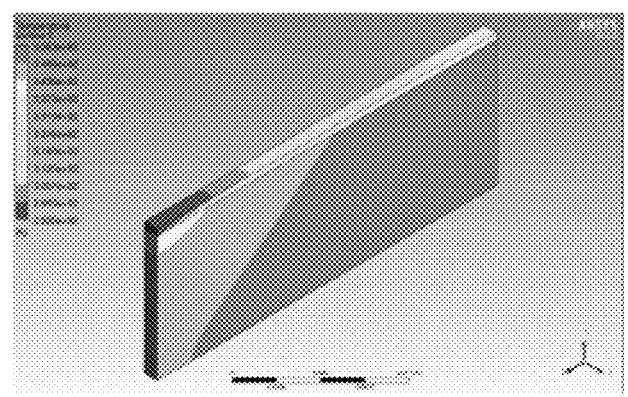
Figure 14D:
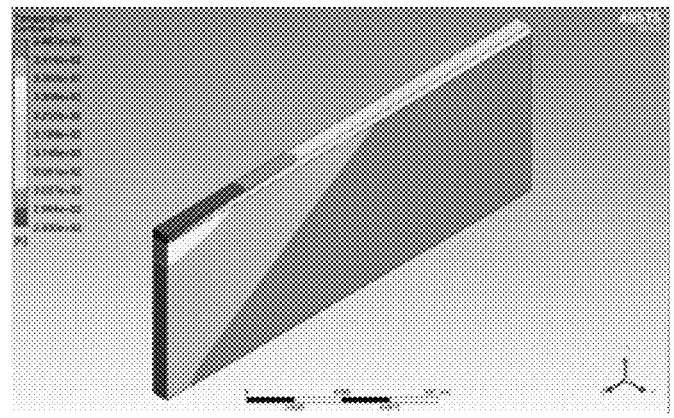
Figure 14E:
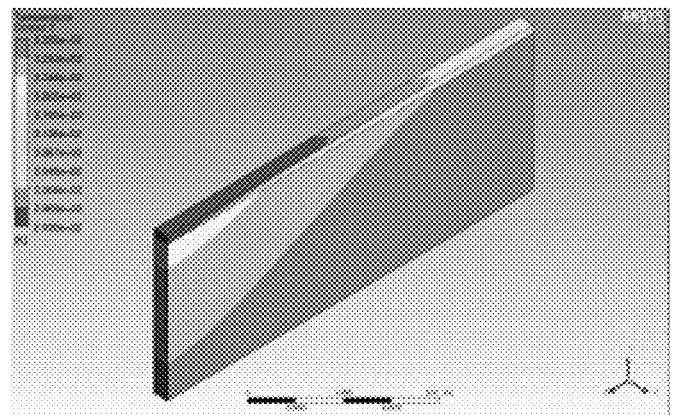

In FIGS. 14A to 14E, FIG. 14A represents a temperature distribution in the battery module 10a when a flow rate of purified air A2 is 1 meter per second (m/s), FIG. 14B represents a temperature distribution in the battery module 10a when a flow rate of purified air A2 is 2 m/s, FIG. 14C represents a temperature distribution of the battery module 10a when a flow rate of purified air A2 is 3 m/s, FIG. 14D represents a temperature distribution of the battery module 10a when a flow rate of purified air A2 is 4 m/s, and FIG. 14E represents a temperature distribution of the battery module 10a when a flow rate of purified air A2 is 8 m/s.

Referring to FIGS. 14A to 14E, a portion of the upper surface of the battery module 10a begins to be cooled as the purified air A2 is supplied to the upper surface of the battery module 10a. As a flow rate of the purified air A2 is increased, a region being cooled extends from the upper surface of the battery cell module 10a toward the lower surface, However, the lower surface of the battery module 10a is cooled only minimally.

Figure 15A:
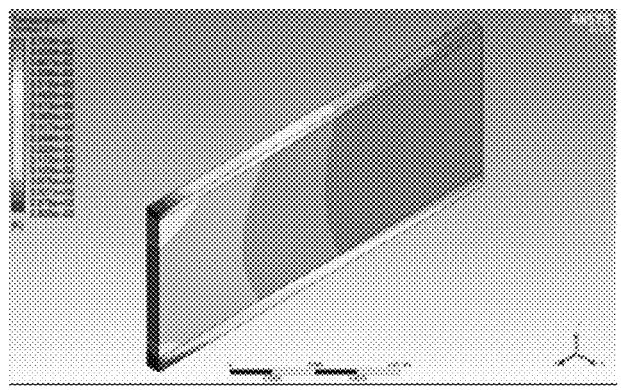
FIGS. 15A to 15E are the results of a simulation to show change in a temperature distribution according to a change of speed of purified air and purge air in a battery module in which a first cooling channel is disposed on a first surface of the battery cell module and a second cooling channel is disposed on a second surface of the battery cell module.
Figure 15B:
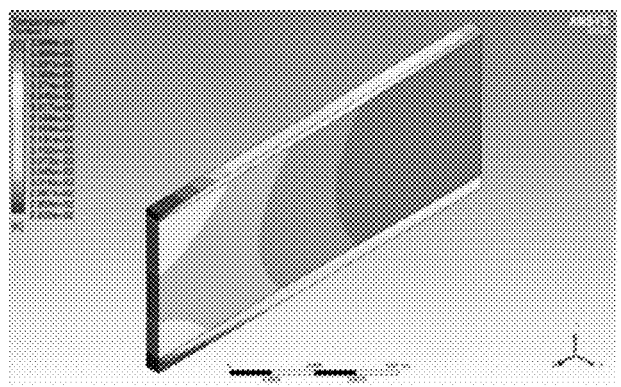
Figure 15C:
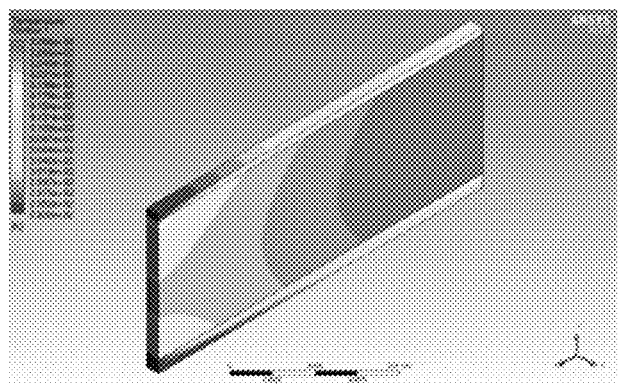
Figure 15D:
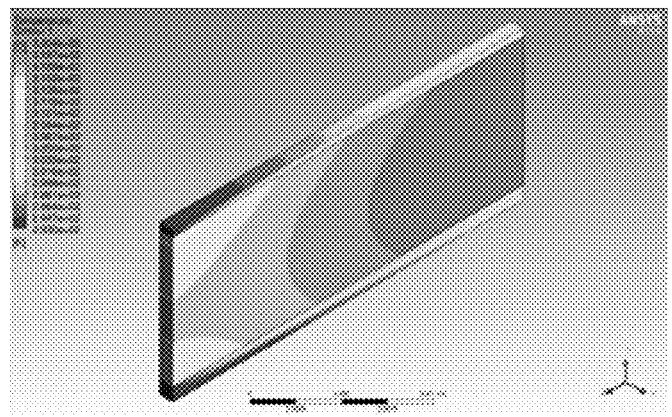
Figure 15E:
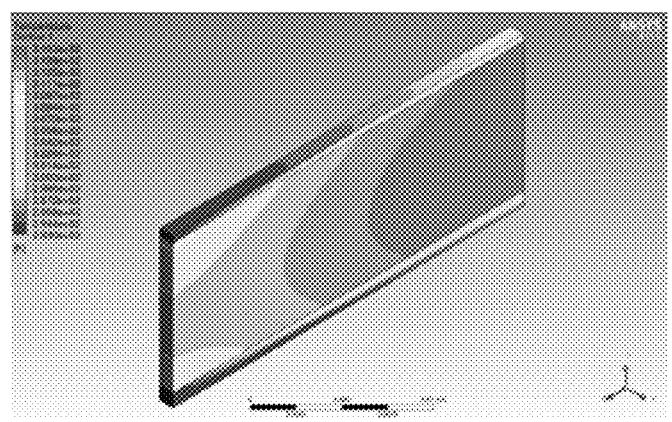

In FIGS. 15A to 15E, FIG. 15A represents a temperature distribution of the battery cell module 10a when respective flow rates of purified air A2 and purge air A3 are 1 m/s, FIG. 15B represents a temperature distribution of the battery module 10a when respective flow rates of purified air A2 and purge air A3 are 2 m/s, FIG. 15C represents a temperature distribution of the battery module 10a when respective flow rates of purified air A2 and purge air A3 are 3 m/s, FIG. 15D represents a temperature distribution of the battery module 10a when respective flow rates of purified air A2 and purge air A3 are 4 m/s, and FIG. 15E represents a temperature distribution of the battery module 10a when respective flow rates of purified air A2 and purge air A3 are 8 m/s.

Referring to FIGS. 15A to 15E, portions of the upper surface and the lower surface of the battery module 10a begin to be cooled as the purified air A2 is supplied to the upper surface of the battery module 10a and the purge air A3 is supplied to the lower surface of the battery module 10a. As a flow rate of the purified air A2 and the flow rate of the purge air A3 is increased, a region being cooled in the battery module 10a is extended. In this case, a cross-sectional area of the first cooling flow passages 310 is the same as the cross-sectional area of the second cooling flow passage 420 of the second cooling channel 40. Furthermore, a cross-sectional area of the first cooling flow passages 310 of the first cooling channel 30 of FIG. 15 is the same as the cross-sectional area of the first cooling flow passages 310 of the first cooling channel 30 supplying the purified air A2 of FIG. 14.

A flow rate of the purified air A2 supplied to an upper surface of the battery module 10a in FIG. 14D is 4 m/s, and respective flow rates of the purified air A2 supplied to an upper surface of the battery module 10a and the purge air A3 supplied to a lower surface of the battery module 10a in FIG. 15B are 2 m/s. Since the cross-sectional areas of the first and second cooling flow passages 310 and 420 are identical, a flow rate of the purified air A2 supplied to an upper surface of the battery cell module 10a in FIG. 14D is the same as a sum of the flow rates of the purified air A2 supplied to the upper surface of the battery module 10a and the purge air A3 supplied to the lower surface of the battery module 10a in FIG. 15B. However, by comparing temperature distributions of FIG. 14D and FIG. 15B, it can be seen that a temperature of the battery module 10a cooled by the first and second cooling channels 30 and 40 is lower than a temperature of the battery module 10a cooled only by the first cooling channel 30 even when an identical flow rate of air is supplied to the battery module 10a.

Figure 16:
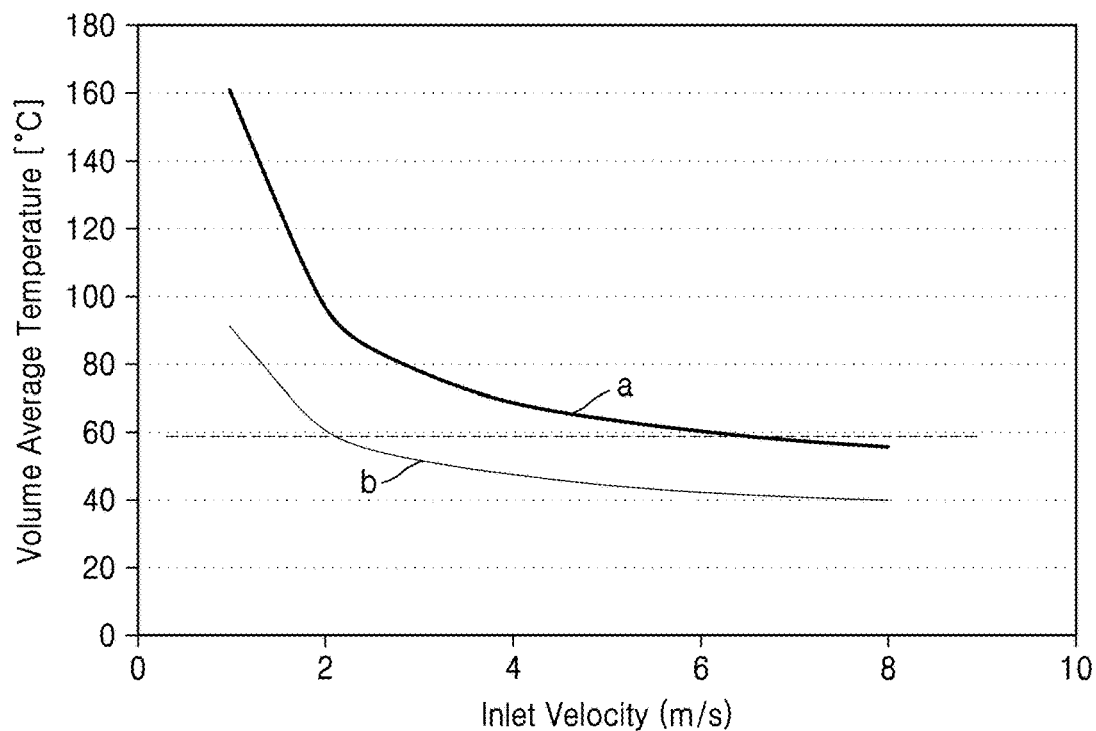
FIG. 16 is a graph of volume average cell temperature (° C.) versus inlet velocity (meters per second, m/s) which illustrates a temperature of a battery module according to a change in speed of the purified air.

FIG. 16 is a graph of a volume average temperature of the battery module 10a according to a change of speed of the purified air A2. In FIG. 16, line "a" represents a temperature of the battery module 10a without the second cooling channel 40 according to the Comparative Example of FIGS. 14A to 14E, and line "b" represents a temperature of the battery module 10a in which the first and second cooling channels 30 and 40 are arranged according to the exemplary embodiment of FIGS. 15A to 15E.

Referring to line "a" of FIG. 16, it can be seen that the temperature of the battery module 10a according to the Comparative Example decreases as a flow rate of the purified air A2 increases. However, the volume average temperature of the battery module 10a exceeds 60° C. when the flow rate is less than or equal to about 6 m/s. For example, when a flow rate of the purified air A2 is 6 m/s, a volume average temperature of the battery module 10a is 60.5664° C.

Meanwhile, Referring to line "b" of FIG. 16, it can be seen that the volume average temperature of the battery module 10a according to the exemplary embodiment decreases as the flow rate of the purified air A2 and the flow rate of the purge air A3 increase, and the temperature of the battery module 10a is less than or equal to about 60° C. even when the flow rates are less than or equal to about 6 m/s. For example, when flow rates of the purified air A2 and the purge air A3 are respectively 3 m/s, a volume average temperature of the battery module 10a is 52.268° C.

Accordingly, it can be seen that a temperature of the battery module 10a in which the first and second cooling channels 30 and 40 are disposed to cool the battery module 10a may be adjusted to be lower than a temperature of the battery module 10a in which only the first cooling channel 30 is disposed to cool the battery module. Furthermore, it can be seen that the volume average temperature of the battery module 10a in which the first and second cooling channels 30 and 40 are disposed is lower than the volume average temperature of the battery module 10a in which only the first cooling channel 30 is disposed even when the flow rate of air supplied to the battery module 10a is identical.

Figure 17:
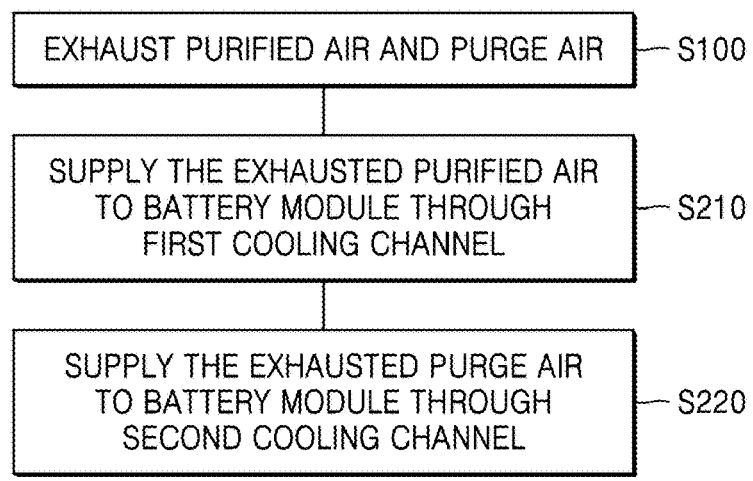
FIG. 17 is a flowchart illustrating a method of operating a metal-air battery according to an exemplary embodiment.

FIG. 17 is a flowchart illustrating a method of operating a metal-air battery 1 according to an exemplary embodiment. Referring to FIG. 17, an impurity is removed from air fed to the air supply module to prepare a purified air and the air supply module 20 according to an exemplary embodiment exhausts the purified air A2 and the purge air A3 (S100).

The exhausted purified air A2 is supplied to the battery module 10 through the first cooling channel 30 (S210). Oxygen included in the supplied purified air A2 is transmitted to the positive electrode layer 13 through the gas diffusion layer 14. Thereafter, a discharging process of generating electricity in the battery module 10 is performed. Furthermore, since a temperature of the purified air A2 is lower than a temperature of the battery module 10, the battery cell module 10 is cooled by the purified air A2.

The exhausted purge air A3 is supplied to the battery module 10 through the second cooling channel 40 (S220). The purge air A3 is supplied to an external surface of the battery module 10 so as not to react with the battery module 10. For example, the purge air A3 comprising the removed impurity is supplied to an external surface of the outer casing 15 of the battery module 10. Since a temperature of the purge air A3 is lower than a temperature of the battery module 10, the battery module 10 is cooled by the purge air A3. The purge air A3 does not come into contact with the inside of the battery module 10 but instead, contacts an external surface of the battery module 10 by way of the second cooling channel 40, thus, it is possible to prevent a side reaction from occurring in which the impurity included in the purge air A3 reacts with a metal of the battery module 10.

As described above, since the purified air A2 and the purge air A3 are supplied through the first and second cooling channels 30 and 40, respectively, discharging and cooling are simultaneously performed in the battery module 10. Therefore, it is possible to reduce energy loss of the metal-air battery 1 which occurs when the purge gas is directly exhausted to the outside without being used to cool the battery module 10. Furthermore, since the additional cooling can be implemented with relatively minor structural modifications, such as including the second cooling channel 40, the battery module 10 may be cooled relatively simply without a complicated configuration for separate cooling.

By using purge air exhausted to the outside from an air supply module to cool a battery module, a metal-air battery according to an exemplary embodiment may be prevented from overheating while simultaneously minimizing energy consumption due to the cooling.

The metal-air battery 1 may be a metal primary battery or a metal secondary battery. In addition, the shape of the metal-air battery is not specifically limited and may be a coin shape, a button shape, a sheet shape, a layered shape, a cylindrical shape, a flat shape, or a horn shape. In addition, the metal-air battery may be applied to a large battery used in an electrical car.

The term "air" used herein is not limited to atmospheric air and may include a combination of gases including oxygen or may be a pure oxygen gas. A wide definition of the term "air" may be applied to all usages, for example, an air battery or an air electrode.

It should be understood that the exemplary embodiments described herein should be considered in a descriptive sense only and not for purposes of limitation. Descriptions of the features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A metal-air battery comprising:
a battery module configured to generate electricity by oxidation of a metal and reduction of oxygen;
an air supply module configured to remove an impurity from air fed to the air supply module, exhaust a purified air which is purified by removing the impurity and a purge air comprising the removed impurity to an outside of the air supply module;
a first cooling channel connected to the air supply module, wherein the first cooling channel is configured to supply the purified air to the battery module and to cool the battery module; and
a second cooling channel connected to the air supply module, wherein the second cooling channel is configured to supply the purge air to an external surface of the battery module and to cool the battery module.

2. The metal-air battery of claim 1, wherein the battery module comprises:
a negative electrode metal layer,
a negative electrolyte membrane disposed on the negative electrode metal layer,
a positive electrode layer which is configured to use oxygen as an active material and is disposed on the negative electrolyte membrane, and
a gas diffusion layer disposed on at least a portion of the positive electrode layer.

3. The metal-air battery of claim 2, wherein the first cooling channel is configured to supply the purified air to the gas diffusion layer of the battery module.

4. The metal-air battery of claim 2, wherein the battery module further comprises an outer casing which surrounds the negative electrode metal layer, the negative electrolyte membrane, and the positive electrode layer,
wherein a portion of the gas diffusion layer is exposed to an outside of the battery module, and wherein the second cooling channel is configured to supply the purge air to an external surface of the outer casing.

5. The metal-air battery of claim 2, wherein
the gas diffusion layer is at least partially disposed on the positive electrode layer,
the negative electrode metal layer, the negative electrolyte membrane, and the positive electrode layer comprise a bend,
the positive electrode layer contacts an upper surface and a lower surface of the gas diffusion layer, and a first side surface of the gas diffusion layer is exposed to the outside of the battery module.

6. The metal-air battery of claim 5, wherein
the gas diffusion layer comprises a plurality of gas diffusion layers,
the negative electrode metal layer, the negative electrolyte membrane, and the positive electrode layer comprise a plurality of bends, and
the positive electrode layer contacts a lower surface and an upper surface of the plurality of gas diffusion layers.

7. The metal-air battery of claim 5, wherein
the first cooling channel is configured to supply the purified air to the first side surface of the gas diffusion layer, and
the second cooling channel is configured to supply the purge air to a second side surface of the gas diffusion layer, which is opposite to the first side surface of the at least one gas diffusion layer.

8. The metal-air battery of claim 1, wherein
the first cooling channel is configured to supply the purified air to a first surface of the battery module; and
the second cooling channel is configured to supply the purge air to a second surface that is opposite to the first surface of the battery module.

9. The metal-air battery of claim 1, wherein the air supply module is configured to remove the impurity from the air fed to the air supply module by an adsorption method or a membrane separation method.

10. The metal-air battery of claim 9, wherein the air supply module is configured for at least one method selected from pressure swing adsorption, temperature swing adsorption, pressure temperature swing adsorption, vacuum swing adsorption, and selective separation.

11. The metal-air battery of claim 1, wherein at least one of the first cooling channel and the second cooling channel includes a material with a thermal conductivity of greater than or equal to about 4 watts per meter Kelvin.

12. The metal-air battery of claim 1, wherein the first cooling channel and the second cooling channel are configured so the purified air supplied to the battery module by the first cooling channel and the purge air supplied to the battery module by the second cooling channel flow in a same direction and a parallel direction with respect to the battery module.

13. The metal-air battery of claim 1, wherein the first cooling channel and the second cooling channel are configured so the purified air supplied to the battery module by the first cooling channel flows in a direction which intersects a flow direction of the purge air supplied to the battery module by the second cooling channel.

14. The metal-air battery of claim 1, wherein the first cooling channel and the second cooling channel are configured so the purified air supplied to the battery module by the first cooling channel flows in an opposite direction and parallel to a flow direction of the purge air supplied to the battery module by the second cooling channel.

15. The metal-air battery of claim 1, wherein the metal for oxidation by the battery module comprises lithium.

16. The metal-air battery of claim 1, wherein the impurity comprises at least one selected from nitrogen, water, and carbon dioxide.

17. A method of operating the metal-air battery of claim 1, the method comprising:
removing an impurity from air fed to the air supply module to prepare a purified air,
exhausting the purified air, wherein at least a portion of the impurity in the air is removed,
purging air comprising the removed impurity to the outside of the air supply module to provide a purge air;
supplying the purified air to the battery module through the first cooling channel; and
supplying the purge air comprising the removed impurity to an external surface of the battery module through the second cooling channel; and
discharging the battery module, wherein the battery module is cooled by the purified air and the purge air supplied through the first and second cooling channels during the discharging.

18. The method of claim 17, wherein the battery module comprises a negative electrode metal layer, a negative electrolyte membrane disposed on the negative electrode metal layer, a positive electrode layer disposed on the negative electrolyte membrane, and at least one gas diffusion layer disposed on at least a portion of the positive electrode layer, wherein the first cooling channel supplies the purified air to the gas diffusion layer of the battery module.

19. The method of claim 17, wherein
the battery module further comprises an outer casing disposed to surround the negative electrode metal layer, the negative electrolyte membrane, and the positive electrode layer,
wherein a portion of the gas diffusion layer is exposed to an outside of the battery module, and
the second cooling channel supplies the purge air to an external surface of the outer casing.

* * * * *